United States Patent
Wang

(10) Patent No.: US 6,520,766 B2
(45) Date of Patent: Feb. 18, 2003

(54) MOLD LOCKING DEVICE FOR A MOLDING MACHINE

(75) Inventor: Jui-Hsiang Wang, Yung Kang (TW)

(73) Assignee: HWA Chin Machinery Factory Co., Ltd., Tainan Hsien (TW)

(*) Notice: Subject to any disclaimer, the term of this patent is extended or adjusted under 35 U.S.C. 154(b) by 119 days.

(21) Appl. No.: 09/729,971

(22) Filed: Dec. 6, 2000

(65) Prior Publication Data

US 2002/0068109 A1 Jun. 6, 2002

(51) Int. Cl.[7] .................................................. B29C 45/64
(52) U.S. Cl. .................. 425/593; 425/451.6; 425/451.7
(58) Field of Search .............................. 425/593, 451.6, 425/451.7

(56) References Cited

U.S. PATENT DOCUMENTS 4,088,432 A * 5/1978 Farrell ........................ 425/593
5,252,286 A * 10/1993 Bugatti ........................ 425/593
5,603,969 A * 2/1997 Guindani et al. ........... 425/593

* cited by examiner

Primary Examiner—James P. Mackey
(74) Attorney, Agent, or Firm—Rosenberg, Klein & Lee

(57) ABSTRACT

A mold locking device for a molding machine has a toggle assembly, and a transmission member. The toggle assembly has first toggle arms pivoted to a bearing disc of the molding machine, connecting arms pivoted to a movable mold base, second arms pivoted to both the first arms and the connecting arms, and has third arms pivoted to both the second arms and a co-moving disc movable between the bearing disc and the movable mold base. The transmission member has a power source, a connecting member and an elongated screw. The connecting member connects the power source and a nut turnably fitted on the co-moving disc; the screw is passed through the nut for permitting the nut to turn relative to, and move along, the screw. The screw is further connected to the movable mold base such that the movable mold base can be moved between a mold opening position and a closing position by the toggle assembly and the power source.

2 Claims, 7 Drawing Sheets

MOLD LOCKING DEVICE FOR A MOLDING MACHINE

BACKGROUND OF THE INVENTION

The present invention relates to a mold locking device for a molding machine, and particularly to one which takes up relatively small space, and is made with relatively low cost.

A molding machine injects plastic material into a mold with a large pressure. The locking force for the mold must be greater than the injecting pressure of the molding machine, otherwise the plastic material would be pushed out of the mold, making the products have undesirable hairy edges.

Referring to FIG. 6, a conventional molding machine has an oil hydraulic cylinder 20, a toggle assembly 10, a movable mold base 30 and a stationary mold base. The movable mold base 30 and the stationary mold base each holds a respective mold half. The oil hydraulic cylinder 20 extends from the main body of the molding machine for a relatively long distance. The oil cylinder 20 and the toggle assembly 10 move the movable mold base 30 in order to open or close the mold.

However, the molding machine takes up too much space whether in transportation or in use in a factory because the oil cylinder is very long.

To overcome the disadvantage, another conventional molding machine is provided, referring to FIGS. 7, 8 and 9, entitled closing unit for a die in double-toggle machines for the molding of plastic materials or for die casting, with filing number 92830069.8 and Italian patent no. 0511170A2.

The molding machine has a bearing disc 1, a toggle assembly 2, a movable mold base 5, a co-moving disc 3 and two oil hydraulic cylinders 4.

The co-moving disc 3 is movably disposed between the bearing disc 1 and the movable mold base 5. The oil hydraulic cylinders 4 are disposed on the co-moving disc 3 (FIG. 9). The co-moving disc 3 further has a central hole for the toggle assembly to pass through.

The toggle assembly 2 includes two first toggle arms 21, two second toggle arms 22, two third toggle arms 23 and two connecting arms 24. The first toggle arms 21 are pivoted on the bearing disc 1 from outer ends, and pivoted to outer ends of the second toggle arms 22 from inner ends. The second toggle arms 22 are pivoted to outer ends of the connecting arms 24 from inner ends. The connecting arms 24 are connected to the movable mold base 5 from inner ends. The third toggle arms 23 are pivoted to the second toggle arms 22 and the co-moving disc 3 from two ends.

When a cylinder moving rod 41 of the oil cylinder 4 moves forwards, same will force the movable mold base 5 to move forwards. Thus, the movable mold base 5 pulls the connecting arms 24 and the second toggle arms 22 in the same direction; the second toggle arms 22 pivot the third arms 23 inwardly of the toggle assembly 2 to push the co-moving disc 3 and the cylinders 4 forwards. When the toggle assembly 2 is moved to a substantially straight position, the mold is closed (FIG. 7).

The second conventional molding machine takes up less space than the first one because the oil cylinders are received between the bearing disc 1 and the movable mold base 5. However, the mold machine has relatively high cost because it needs two oil cylinders on two side of the co-moving disc for the toggle assembly and the movable mold base to move smoothly.

SUMMARY OF THE INVENTION

Therefore, it is a main object of the present invention to provide a molding machine which can overcome the disadvantages of the above-mentioned molding machine.

The mold locking device for a molding machine of the present invention includes a toggle assembly, and a transmission.

The toggle assembly includes two first toggle arms, two second toggle arms, two third toggle arms and two connecting arms. The first toggle arms are pivoted to a bearing disc of the molding machine. The second toggle arms are each pivoted to a respective one of the first toggle arms from one end. The third toggle arms are each pivoted to an intermediate portion of the respective second toggle arm from one end, and pivoted to a co-moving disc of the molding machine from other end. The co-moving disc has a nut turnably fitted to a central portion.

The connecting arms are each pivoted to the respective second toggle arm, and a movable mold base of the molding machine from two ends. The movable mold base is provided for one of two halves of a mold to be held on.

The transmission member includes a power, an elongated screw and a connecting member. The connecting member connects the power and the nut of the co-moving disc. The elongated screw is turnably passed through the nut, and connected to the movable mold base. When the transmission member is started for the nut to turn in a first position, the nut moves forwards along the screw, pushing the co-moving disc, and the movable mold base forwards, moving the toggle assembly to a mold closing position to close the mold.

Only one transmission member is needed in place of two oil cylinder so the molding machine has relatively low cost.

BRIEF DESCRIPTION OF THE DRAWINGS

This invention will be better understood by referring to the accompanying drawings, wherein.

DESCRIPTION OF THE PREFERRED EMBODIMENTS

Figure 1:
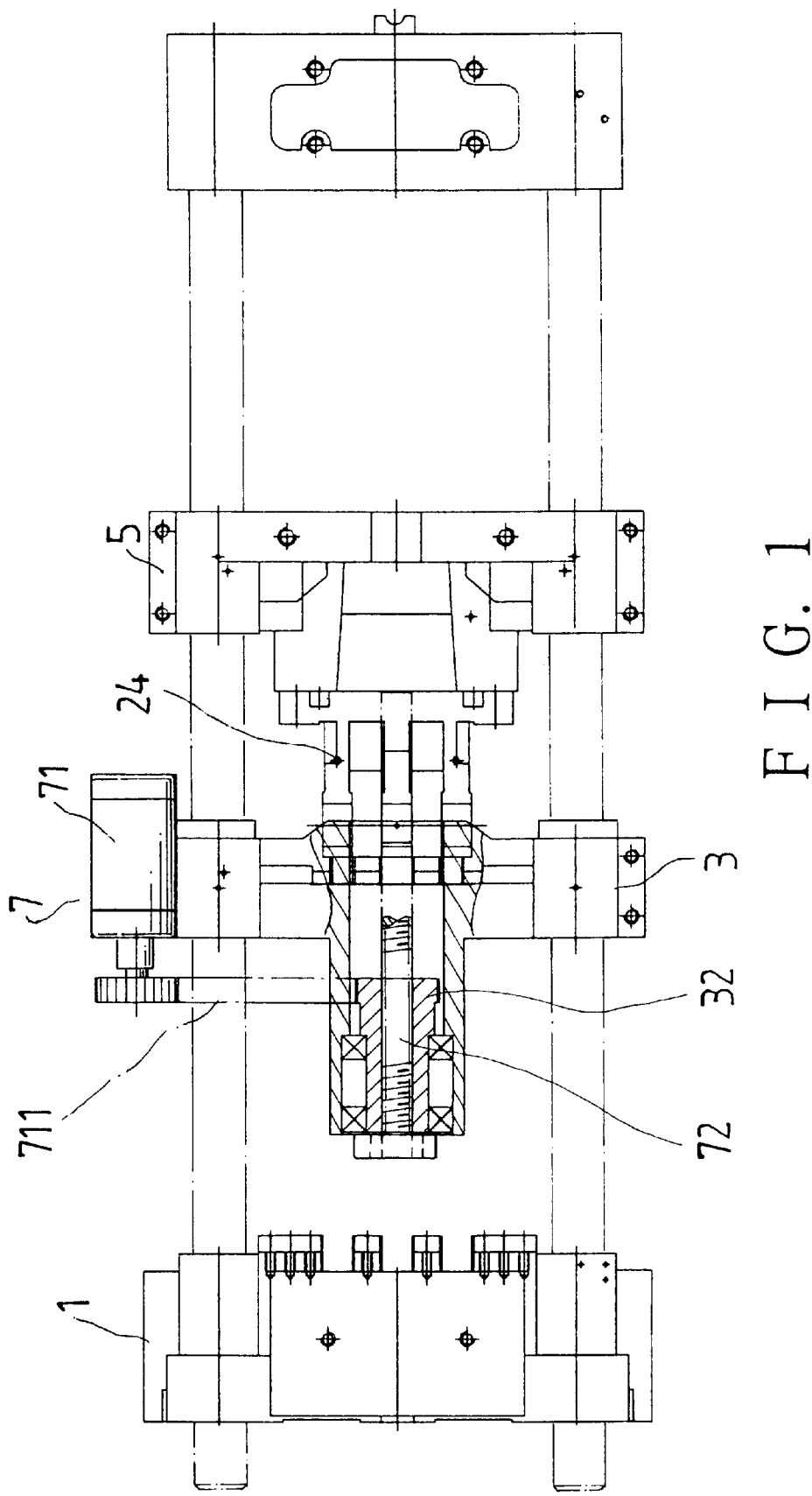
FIG. 1 is a top view of the molding machine according to the first embodiment of the present invention.
Figure 2:
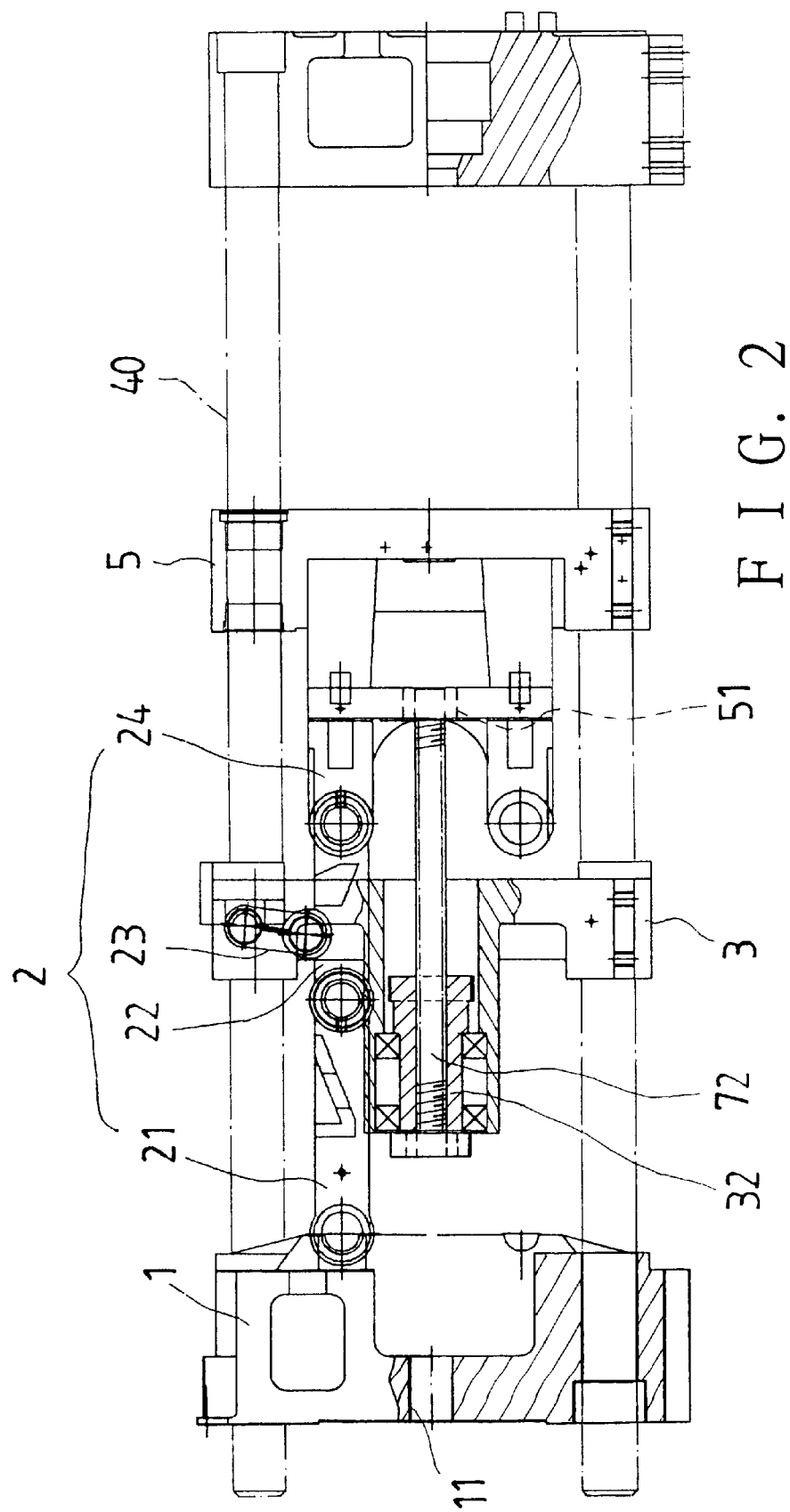
FIG. 2 is a front view of the molding machine according to the first embodiment of the present invention under the mold closing position.

Referring to FIGS. 1 and 2, a molding machine of the present invention includes a bearing disc 1, a toggle assembly 2, a co-moving disc 3, a movable mold base 5, tie bars 40 and a transmission device 7.

The bearing disc 1 has a through hole 11. The movable mold base 5 is movably disposed between the bearing disc 1 and the stationary mold base at the right end (not numbered). The movable mold base 5 has a connecting element 51 on an outer side.

The co-moving disc 3 is movably disposed between the bearing disc 1 and the movable mold base 5. A nut 32 is turnably connected to the co-moving disc 3. The co-moving disc 3 further has a central hole (not numbered) for the toggle assembly to pass through.

The toggle assembly includes two first toggle arms 21, two second toggle arms 22, two third toggle arms 23 and two connecting arms 24. The first toggle arms 21 are pivoted on the bearing disc 1 from outer ends, and pivoted to outer ends of the second toggle arms 22 from inner ends. The second toggle arms 22 are pivoted to outer ends of the connecting arms 24 from inner ends. The connecting arms 24 are connected to the movable mold base 5 from inner ends. The third toggle arms 23 are pivoted to the second toggle arms 22 and the co-moving disc 3 from two ends.

The transmission device 7 includes a power 71, a connecting member 711 and an elongated screw 72. The power 71 is fixed on the molding machine. The elongated screw 72 is connected to the connecting element 51 of the movable mold base 5 from an inner end, and passed through the nut 32, and the co-moving disc 3; the nut 32 can be turned relative to the elongated screw 72 to move along the screw 72. The connecting member 711 connects the power 71 and the nut 32 on the co-moving disc 3 such that the nut 32 can be turned when the transmission device 7 is started.

To close the mold, the transmission device 7 will drive the nut 32 to turn by means of the connecting member 711. The nut 32 moves rearwardly along the elongated screw 72, forcing the co-moving disc 3 to move forward. Thus, the movable mold base 5 is pushed forward along the tie bars 40. The movable mold base 5 pulls the second toggle arms 22 for the same to pivot from a first position in FIG. 3 to a second position in FIG. 2. Meanwhile, the second toggle arms 22 pivot the third toggle arms 23 inwardly to push the co-moving disc 3 forward. At the end of the mold locking movement (FIG. 2), the toggle assembly 2 closes the mold with a big force.

Figure 3:
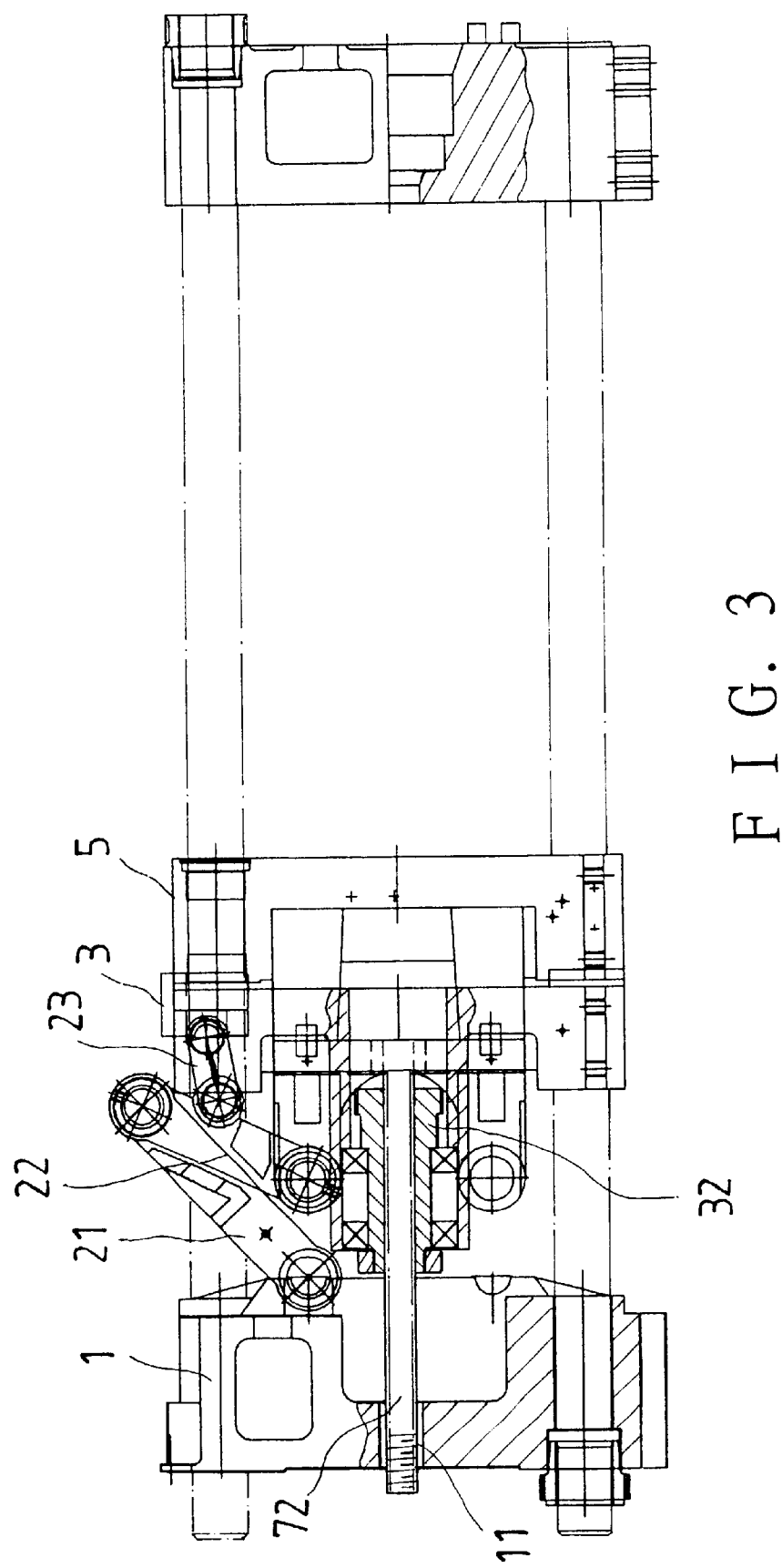
FIG. 3 is a front view of the molding machine according to the first embodiment of the present invention under the mold opening position.

In the mold opening movement, the transmission device 7 will drive the nut 32 to turn in a reverse direction for the same to move forward along the elongated screw 72. Thus, the movable mold base 5 moves rearwardly, causing the connecting arms 24 to move rearwardly, and the second toggle arms 22 to pivot from the second position to the first position. The second toggle arms 22 pivot the third toggle arms 23 outwards, and pull the co-moving disc 3 rearwardly. The through hole 11 permits the elongated screw 72 to pass therethrough when the same is moved rearwardly in the mold opening movement. Thus, the molding machine is in the opening position as shown in FIG. 3.

Figure 4:
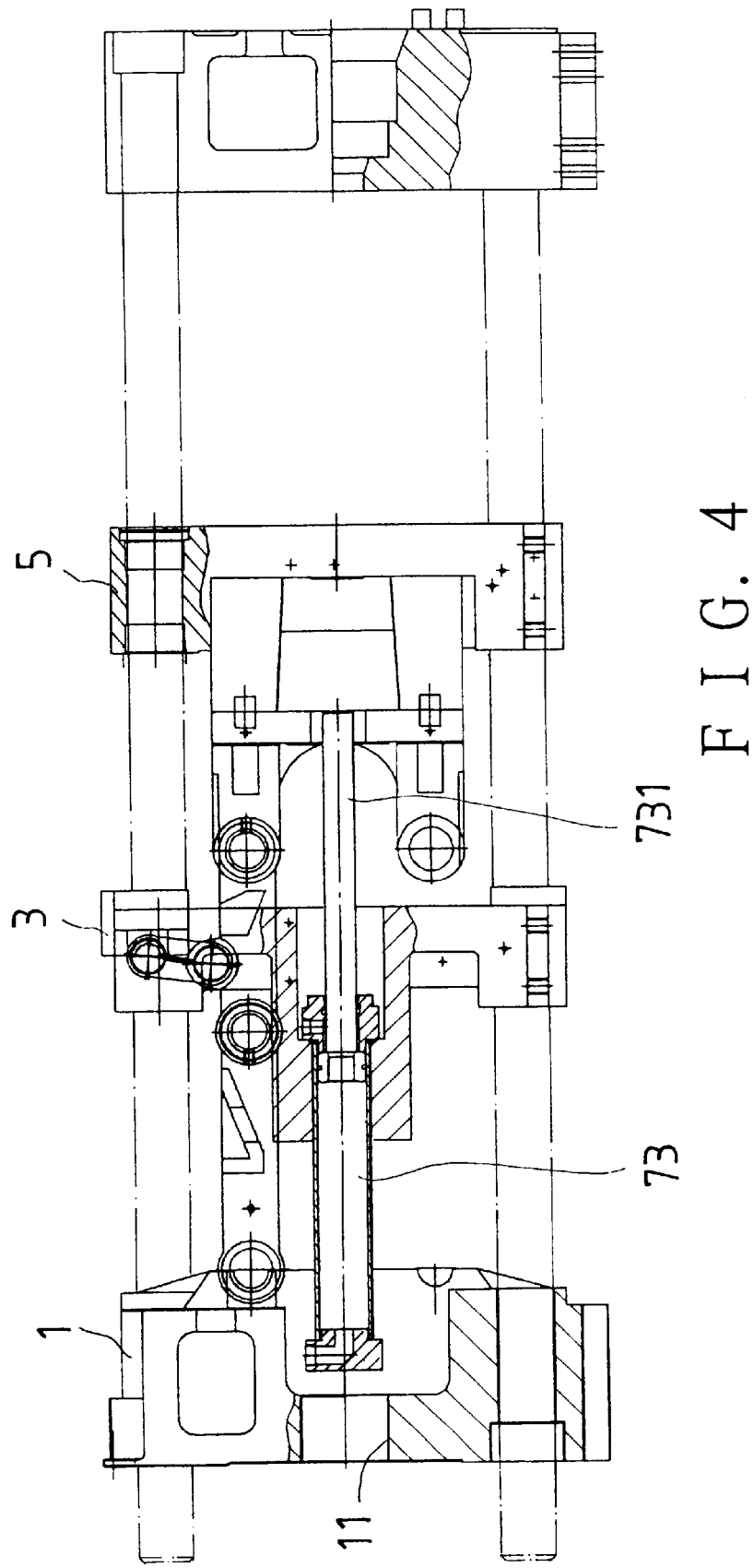
FIG. 4 is a front view of the molding machine according to the second embodiment of the present invention under the mold closing position.
Figure 5:
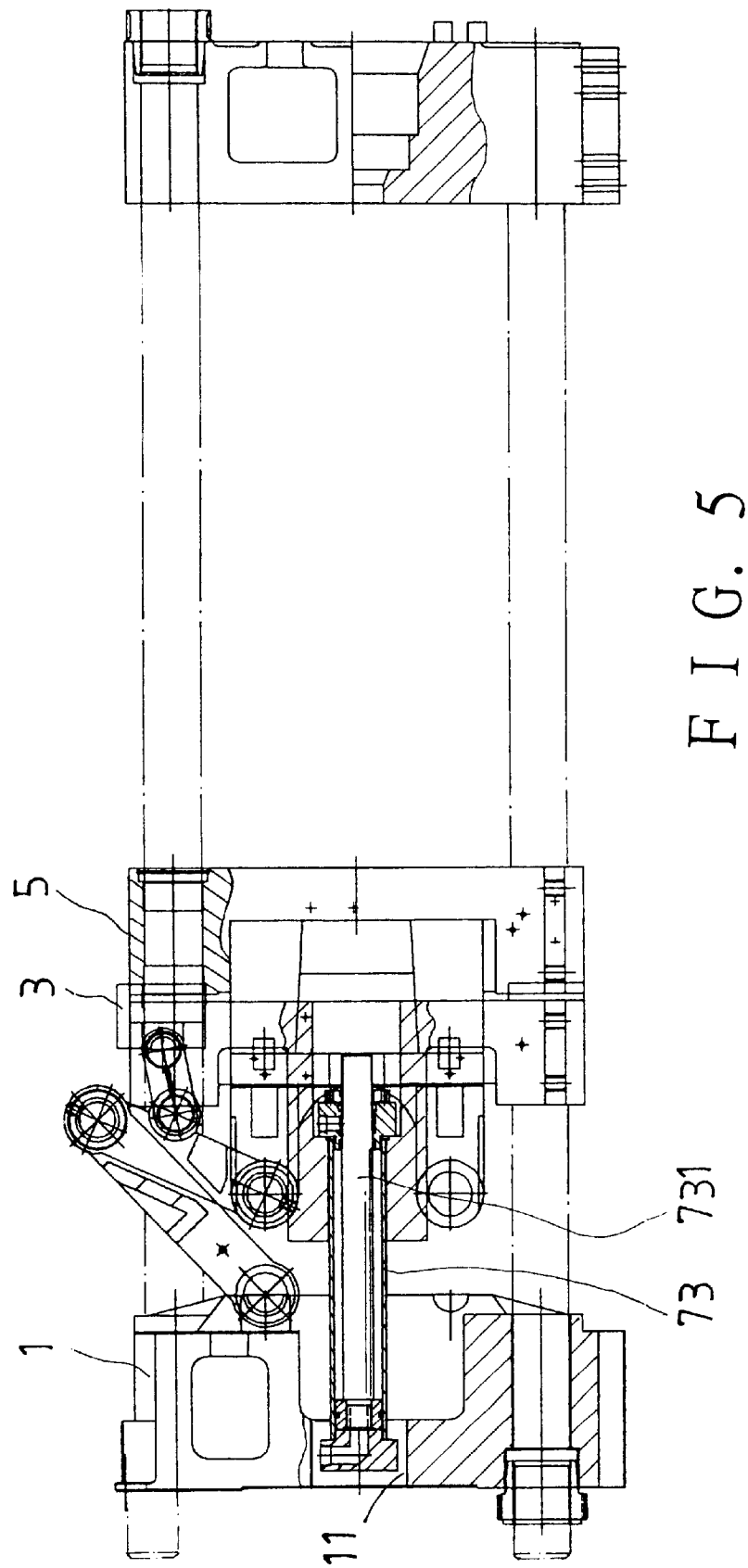
FIG. 5 is a front view of the molding machine according to the second embodiment of the present invention under the mold opening position.
Figure 6:
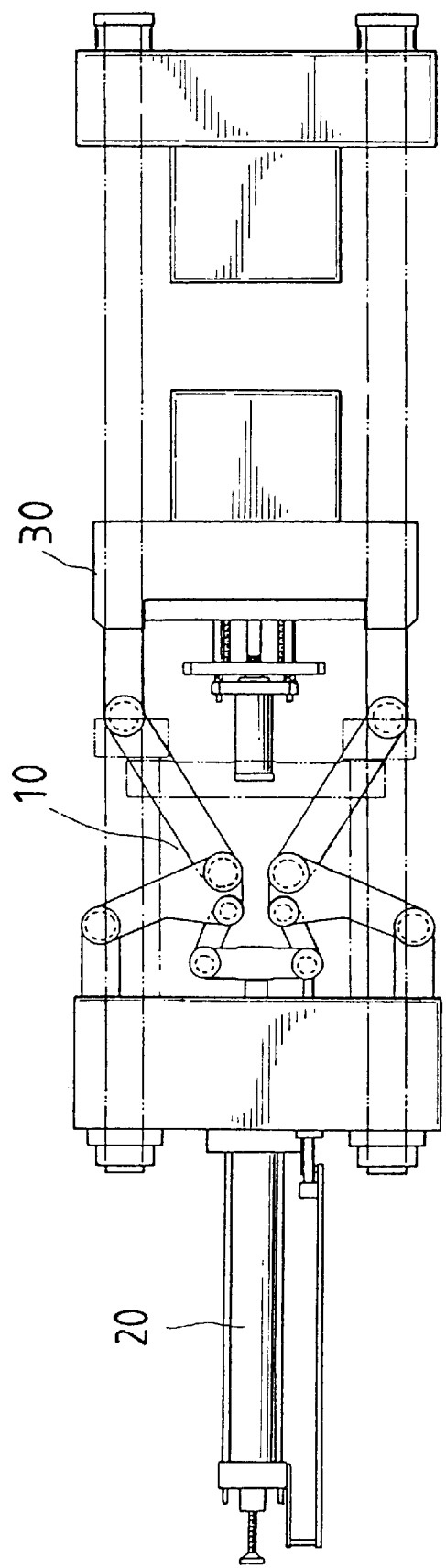
FIG. 6 is a view of the first conventional molding machine in the Background.
Figures 7, 8, 9:
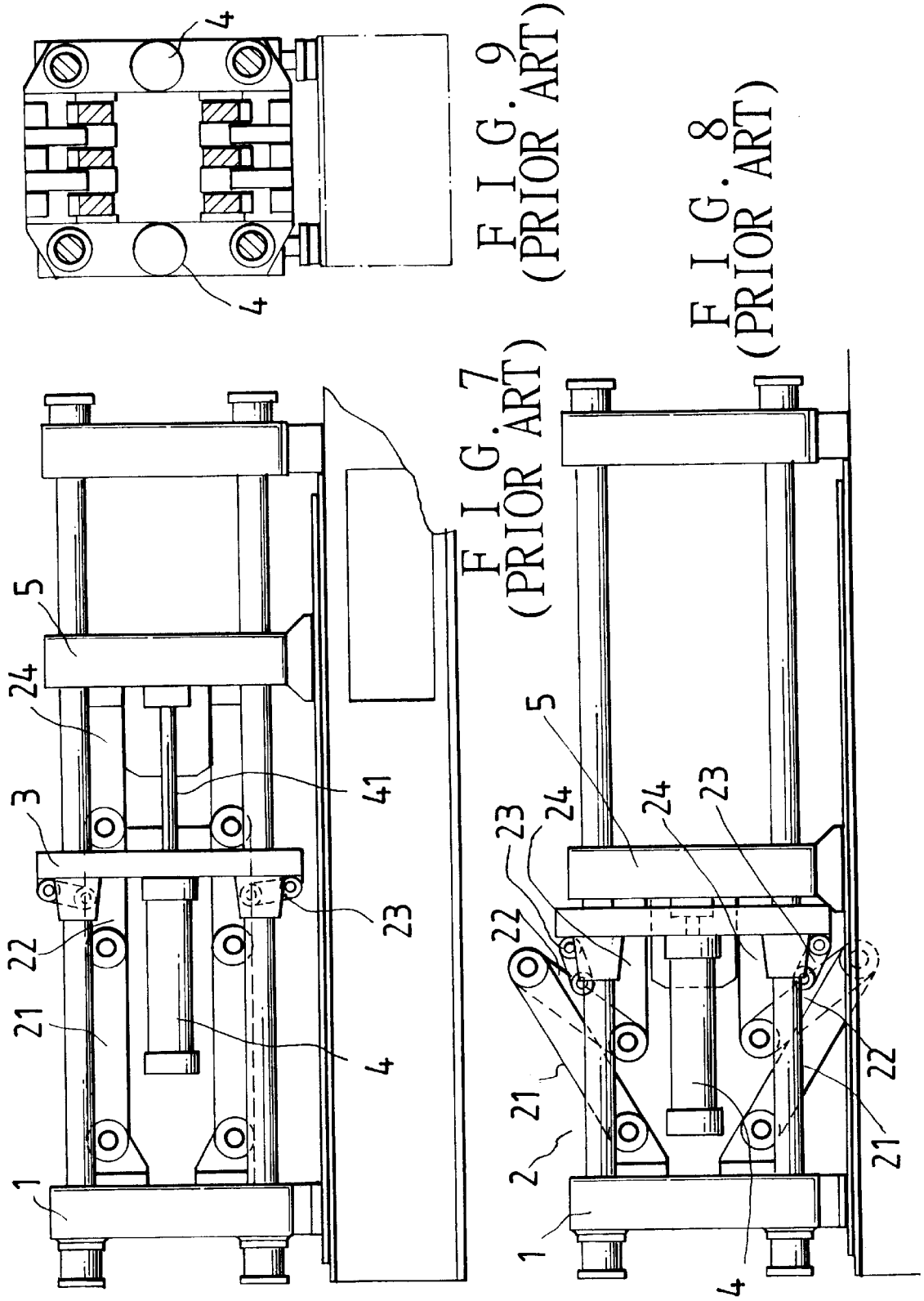
FIG. 7 is a front view of the second conventional molding machine in the Background
FIG. 8 is a front view of the second conventional molding machine in the Background under the mold opening position.
FIG. 9 is a side view of the second conventional molding machine in the Background

In a second embodiment of the present invention, referring to FIGS. 4 and 5, the molding machine in the first embodiment is provided with an oil hydraulic cylinder 73 in place of the transmission device 7. The oil cylinder 73 is fitted to a central portion of the co-moving disc 3, and has a moving rod 731 connected to an outer side of the movable mold base 5. Thus, the mold locking device can move the movable mold base by means of the oil cylinder, and the toggle assembly to open and close the mold.

From the above description, the mold locking devices for a molding machine of the present invention can be known to have desirable features as follows.

1. the locking device takes up relatively small space; not having an oil cylinder extending very long.
2. The locking device needs only one transmission device so the cost is lower than that of the conventional one which uses two oil cylinders.

What is claimed is:

1. A mold locking device for a molding machine, comprising:
    (a) a toggle assembly, including:
        two first toggle arms, said first toggle arms being pivoted to an inner side of a bearing disc of said molding machine fixedly disposed on one end of said molding machine;
        two second toggle arms, said second toggle arms being each pivoted to a respective one of said first toggle arms from an outer end thereof;
        two third toggle arms, said third toggle arms being each pivoted to an intermediate portion of a respective one of said second toggle arms from a first end thereof, each of said third toggle arms having a second end pivoted to a co-moving disc of said molding machine movable along tie bars of said molding machine, said second toggle arms being movably passed through said co-moving disc, said co-moving disc having a nut rotatably disposed at a central portion thereof,
        two connecting arms, each of said connecting arms being pivoted to an inner end of a respective one of said second toggle arms from one end thereof, each of said connecting arms having a second end pivoted to a movable mold base of said molding machine movable along said tie bars and,
    (b) a transmission member, including:
        a power source fixedly fitted to said molding machine;
        an elongated screw rotatably passing through said nut and said co-moving disc, said elongated screw being connected to said movable mold base from an inner end thereof;
        a connecting member connecting said power source to said nut, said nut being rotated relative to said elongated screw by said connecting member driven by said power source when said transmission member is started, said nut being capable of moving rearwardly along said elongated screw when being turned in a first direction to thereby push said co-moving disc and said movable mold base forward, said toggle assembly being pulled to a mold closing position by said movable mold base being pushed forward where said first, said second and said connecting toggle arms are aligned and said third toggle arms are pushing said co-moving disc forward.

2. The mold locking device for a molding machine as claimed in claim 1, wherein said bearing disc has a through hole for passing said elongated screw therethrough during a mold opening movement where said co-moving disc, said screw and said movable mold base are moved towards said bearing disc.

\* \* \* \* \*